Patented Sept. 10, 1935

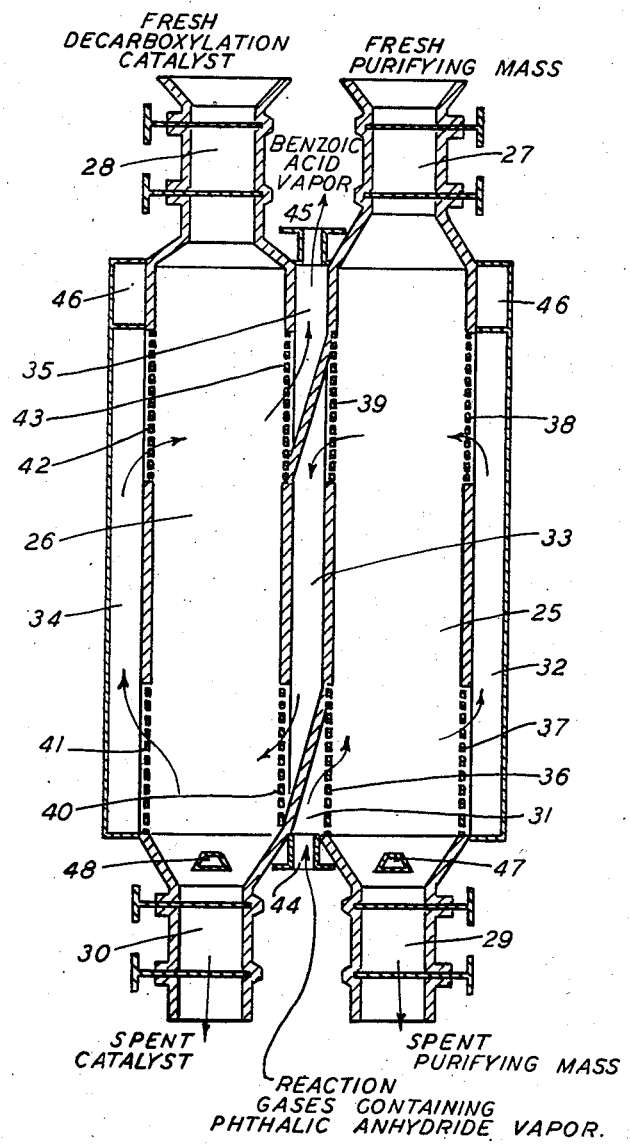

2,013,973

UNITED STATES PATENT OFFICE 2,013,973

APPARATUS FOR THE PRODUCTION OF PHTHALIC ANHYDRIDE AND BENZOIC ACID

Max Scharff, Heidelberg, Johannes Brode, deceased, late of Ludwigshafen-on-the-Rhine, by Käthe Brode, administratrix, Ludwigshafen-on-the-Rhine, and Adolf Johannsen and Josef Reichart, Ludwigshafen-on-the-Rhine, Germany, assignors to I. G. Farbenindustrie Aktiengesellschaft, Frankfort-on-the-Main, Germany Original application August 14, 1929, Serial No. 385,859. Divided and this application November 9, 1933, Serial No. 697,302

2 Claims. (Cl. 23—288)

The present invention relates to the conversion of naphthalene into phthalic anhydride by catalytic oxidation and also to the conversion into benzoic acid of the phthalic anhydride thus obtained without an intermediary separation and is a division of the application Ser. No. 385,859, filed August 14th, 1929, now Patent No. 1,988,876. More particularly the invention relates to apparatus for purifying the phthalic anhydride, thus rendering it possible to separate it in a pure state, which apparatus may also be used for the treatment of the phthalic anhydride vapors with a catalyst splitting off carbon dioxide, whereby the phthalic anhydride is converted into benzoic acid. Catalysts suitable for this conversion into benzoic acid are described and claimed in the application for patent by Johannes Brode and Adolf Johannsen, Ser. No. 149,520, filed November 19, 1926. The process for the purification of phthalic anhydride is generically described and claimed in the U. S. Patent No. 1,693,915, granted December 4th, 1928, to Johannes Brode and Adolf Johannsen. A specific method of making benzoic acid, in which the gas mixture containing phthalic anhydride is first passed over a purifying mass or over a catalyst for making benzoic acid, which is poisoned and thereby reduced in its activity, forms the subject-matter of the U. S. Patent No. 1,889,945, dated December 6th, 1932. The present invention chiefly relates to apparatus suitable for carrying out the processes of the aforesaid patents and application for patent.

We shall now describe our invention by reference to the production of benzoic acid from phthalic anhydride.

While the production of phthalic anhydride by the catalytic oxidation of naphthalene is a highly exothermic reaction, the conversion of the phthalic anhydride into benzoic acid proceeds with only a slight disengagement of heat. Since the gases leaving the oxidation catalyst are directly subjected to the treatment with the catalyst splitting off carbon dioxide, the phthalic anhydride is in a highly diluted state and the increase in temperature in this diluted condition is only about 20° C. when the reaction proceeds adiabatically. The most favorable temperature for the conversion into benzoic acid is slightly lower than that required for the catalytic oxidation of naphthalene and it is therefore possible to pass the gases leaving the oxidation catalyst with a temperature of about 400° C. over the catalyst capable of splitting off carbon dioxide directly or after slightly cooling them, which does not present any difficulties in practice. Means for controlling the temperature during the decarboxylation need not be provided, but the gases can be brought to reaction in a simple vessel filled with the catalyst, for example in an apparatus somewhat similar in appearance to a shaft furnace.

The conversion of the phthalic anhydride into benzoic acid is, however, attended with the difficulty that the catalysts are very liable to poisoning by sulphuric acid vapors which are formed in the oxidation by the combustion of organic impurities containing sulphur which are present in commercial naphthalene. As has been pointed out in the said U. S. Patent No. 1,889,945 this poisoning action of the gases is counteracted by first contacting the gases with a catalyst which has already been poisoned to some extent by sulphuric acid, but which is still capable of taking up considerable amounts of sulphuric acid, and only then contacting the gases with fresh catalyst. This process is preferably carried out by conducting the catalyst in a counter-current to the gases either continuously or periodically. In the same way highly active catalysts of high value can be protected by first passing the gases through masses which have a substantially lower catalytic activity and are much cheaper and which take up the sulphuric acid. Examples of such purifying masses are, for example, pumice granules, zeolites and the like. In such processes it is advantageous to pass at least the purifying masses in counter-current to the gases and our invention relates more particularly to apparatus for conducting the catalyst or purifying masses in counter-current to the gases in a reliable manner.

Our invention will be fully described with reference to the accompanying diagrammatical drawing which shows a form of apparatus suitable for carrying out our invention.

The apparatus shown in the drawing allows of employing two different catalysts, or of one catalyst and a purifying mass, the gases being passed first through the purifying mass and then through the catalyst. The said apparatus consists of two vertically arranged shafts 25 and 26 which may be, for example, of rectangular or square cross-section. Each of the said chambers is provided with sluices 27 and 28 at the upper ends and 29 and 30 at the lower ends, which serve for supplying the fresh catalyst or purifying mass and for withdrawing the spent masses while the apparatus is in operation. On both sides of the said chambers and also between them there are arranged narrow chambers 31, 32, 33, 34 and 35 which are connected with the shaft by the sieve-plates 36, 37, 38, 39, 40, 41, 42 and 43. The gases to be treated are admitted into the chamber 31 by means of the tube 44 and pass through the sieve-plate 36 into the chamber 25. They pass therethrough in horizontal direction and then by the sieve-plate 37 into the chamber 32. From this chamber they pass through the sieve-plate 38 and again in the horizontal direction through the mass or catalyst in the chamber 25 and leave the chamber by way of the sieve-plate 39 and the chamber 33. They next enter the chamber 26 by way of the sieve-plate 40, pass through the mass in said chamber again in the horizontal direction, next enter the chamber 34 by way of the sieve-plate 41 and then pass through the sieve-plate 42 again into the mass contained in the chamber 26 in the horizontal direction and are withdrawn by way of the sieve-plate 43, the chamber 35 and the tube 45. The horizontal distance between each pair of sieve-plates 36 and 37, 38 and 39, 40 and 41, 42 and 43, respectively, is smaller than the vertical distance between each two sieve-plates 36 and 39, 37 and 38, 40 and 43, 41 and 42, respectively, and therefore the gases pass mainly in the horizontal direction through the catalyst or purifying mass, since this direction offers the lowest resistance to the gases. Means may also be provided for passing the gas leaving the chamber 36 first through an annular chamber 46 surrounding the upper parts of the chambers 25 and 26, whereby the fresh catalyst or purifying mass is preheated. In the lower part of the chambers 25 and 26, there are provided resistance devices 47 and 48 which prevent the catalyst or purifying mass from falling more rapidly in the center of each chamber than at the outside thereof. When the apparatus is put into operation, it may be heated by passing through hot air, or any suitable heating devices may be provided in the chambers 32 and 34.

It may be noted here that all apparatus described in the foregoing are provided with heat insulation in order to prevent losses of heat. This insulation is not shown in the drawing for the sake of greater clearness. Also the apparatus is provided with means for controlling the temperature which is also not shown in the drawing. In the same way as hereinbefore described for the production of benzoic acid, the apparatus may be used for the purification of phthalic anhydride by contact with solid masses absorbing sulphur compounds, as for example pumice stone, silica gel, zeolites, bauxite and the like. In such case the gases leaving the oxidation catalyst are cooled before entering the purification apparatus so far that no catalytic action of the purifying masses takes place. In this connection it may be pointed out that the said purifying masses possess to a small extent the property of splitting off carbon dioxide and of producing benzoic acid when used at high temperatures. Further the power of the said masses of absorbing sulphuric acid is higher at lower temperatures. However, the temperatures should not be so low that separation of the phthalic anhydride vapors contained in the gases takes place and the most suitable temperature is therefore about 200° C. By the separation of the sulphuric acid the formation of dark colored condensation products of alpha-naphthoquinone during the separation of the phthalic anhydride is prevented. The small amounts of alpha-naphthoquinone present in the gases are separated only on extensive cooling together with the last traces of phthalic anhydride, whereas the bulk of the latter is separated as a pure white crystalline mass or powder of excellent purity.

What we claim is:—

1. Apparatus suitable for producing benzoic acid from phthalic anhydride and for purifying phthalic anhydride produced by the catalytic oxidation of naphthalene which comprises two chambers, each of them having two vertical sieve-plates in its lower part and two further sieve-plates in its upper part and further having means for withdrawing solids from, and for supplying fresh solids to said chamber, a gas inlet connected to one of the lower sieves of the first chamber, a passage between the other lower sieve and one of the upper sieves of the first chamber, a passage between the other upper sieve of the first chamber and one of the lower sieves of the second chamber, a passage between the other lower sieve and one of the upper sieves of the second chamber, and a gas outlet connected to the other upper sieve of the second chamber.

2. Apparatus suitable for producing benzoic acid from phthalic anhydride and for purifying phthalic anhydride produced by the catalytic oxidation of naphthalene which comprises two chambers, each of them having two vertical sieve-plates in its lower part and two further sieve-plates in its upper part and further having means for withdrawing solids from, and for supplying fresh solids to said chamber, a gas inlet connected to one of the lower sieves of the first chamber, a passage between the other lower sieve and one of the upper sieves of the first chamber, a passage between the other upper sieve of the first chamber and one of the lower sieves of the second chamber, a passage between the other lower sieve and one of the upper sieves of the second chamber, and a gas outlet connected to other upper sieve of the second chamber, the horizontal distances between the lower and upper sieves, respectively, of one chamber being smaller than the vertical distance between corresponding lower and upper sieves.

MAX SCHARFF.
KÄTHE BRODE,
*Administratrix of Johannes Brode, Deceased.*
ADOLF JOHANNSEN.
JOSEF REICHART.